United States Patent [19]

Kemp

[11] 4,142,840
[45] Mar. 6, 1979

[54] COFFEEMAKER PUMP SYSTEM

[75] Inventor: Charles L. Kemp, Asheboro, N.C.

[73] Assignee: General Electric Company, Bridgeport, Conn.

[21] Appl. No.: 857,210

[22] Filed: Dec. 5, 1977

[51] Int. Cl.² .............................................. F04B 19/24
[52] U.S. Cl. ....................................... 417/209; 99/310
[58] Field of Search ....................... 417/207, 208, 209; 99/281, 283, 310, 313

[56] References Cited

U.S. PATENT DOCUMENTS

| | | | |
|---|---|---|---|
| 3,226,528 | 12/1965 | Martin | 99/281 X |
| 3,717,748 | 2/1973 | Imler | 417/209 X |
| 3,793,933 | 2/1974 | Weber | 99/283 |
| 3,856,435 | 12/1974 | Ballard | 417/209 X |
| 3,996,846 | 12/1976 | Hupf | 99/310 X |

Primary Examiner—Carlton R. Croyle
Assistant Examiner—Edward Look
Attorney, Agent, or Firm—John F. Cullen; George R. Powers; Leonard J. Platt

[57] ABSTRACT

A generally C-shaped coffeemaker housing holds a heated carafe on one horizontal leg and a water spreader on the other with the vertical leg enclosing an accessible water reservoir having an apertured bottom wall. The housing has a pump and heated chamber in the bottom for delivering heated water to the spreader and a tubular outer conduit connecting the reservoir and chamber with a concentric spaced inner conduit between the chamber and reservoir interior. An integral one way valve is provided on the inner conduit between the conduits and the chamber permitting cold water into the chamber through the outer conduit and hot water exit through the inner conduit. To this conventional structure, an improvement is provided in a four-part pump and delivery subassembly comprising an insulating tube surrounding the inner conduit its entire length, a cylindrical heat resistant plastic retainer on the upper end of the inner conduit and a spring between the retainer and insulating means to abut both to telescopically bias the retainer. The retainer has horizontal ears that match slots in the bottom wall aperture and a manually removal flexible elastomer tube connects the spreader and upper inner conduit whereby the entire pump and delivery subassembly may be completely removed by detaching the elastomer tube then pressing and rotating the retainer to align the ears and slots and unlock the retainer to lift out the entire subassembly which then may be concentrically separated for cleaning.

5 Claims, 2 Drawing Figures

COFFEEMAKER PUMP SYSTEM

BACKGROUND OF THE INVENTION

1. Field of the Invention

The invention pertains to a coffeemaker of the drip type wherein water is heated within a housing and pumped to a spreader to discharge into a supported carafe. The present invention is directed to an improved pump and delivery subassembly of few parts and easy removability whereby the entire subassembly may be depressed and lifted out and then concentrically separated into four simple parts for easy cleaning and reassembly.

2. Description of the Prior Art

In electric drip coffeemakers, it has been common practice to provide a generally C-shaped molded plastic housing with a lower horizontal leg for holding a heated carafe and the other upper horizontal leg forming an overhanging top wall located above the carafe and containing a spreader for dripping water through an intermediate coffee brew basket and into the carafe. The vertical leg contains an internal water reservoir and a heating chamber which supplies heated water through a water spreader in the top wall of the housing into the coffee brew basket. Such a general coffeemaker has widely replaced the percolator types and an arrangement of this general type is shown in U.S. Pat. No. 3,968,740 of common assignment. These coffeemakers may come in numerous sizes and smaller four cup coffeemakers have been simplified but operate on the same general principles and such a coffeemaker is shown in U.S. Pat. No. 3,996,846.

As in all such coffeemakers, it is desirable to remove the pump and delivery means for cleaning and to this end it has been common to provide the parts in a subassembly that may be removed for easy cleaning. Such an arrangement is shown in said '846 patent. One of the constant aims is to reduce the cost of such coffeemakers as well as the number of parts and still maintain easy cleanability. The present invention is an improvement on the general structure of said U.S. Pat. No. 3,996,846.

SUMMARY OF THE INVENTION

In accordance with the invention, a generally C-shaped coffeemaker plastic housing holds a heated carafe on one horizontal leg and a water spreader on the other upper horizontal leg with the vertical leg portion enclosing an accessible water reservoir having an apertured bottom wall. The housing has a pump and heated chamber in its bottom for delivering heated water to the spreader and it has a tubular outer conduit connecting the reservoir and chamber with a concentric spaced inner conduit between the chamber and reservoir interior. A one-way valve is provided as an integral portion of the inner conduit between the conduits and the chamber permitting cold water into the chamber through the outer conduit and hot water exit through the inner conduit. Thus far, this is conventional coffeemaker structure and to this structure an improvement is provided in a four-part pump and delivery subassembly that has an insulating tube surrounding the inner conduit throughout its entire length, and a cylindrical heat resistant plastic retainer is provided on the upper end of the inner conduit and a spring is disposed between the retainer and the insulating means to abut against both to telescopically bias the retainer on the conduit. The retainer has horizontal ears that match slots in the bottom wall aperture and a manually removable flexible elastomer tube connects the spreader and the upper portion of inner conduit whereby the entire pump and delivery subassembly may be completely removed by detaching the elastomer tube, then depressing and rotating retainer to align the ears and slots to unlock the retainer to lift out the entire subassembly which is then concentrically separated for cleaning and reassembly. Thus, the main object of the present invention is to provide an improved coffeemaker pump system that uses only four parts as a subassembly that is easily removed and then concentrically separable for easy cleaning without the use of tools.

DESCRIPTION OF THE PREFERRED EMBODIMENT

Figure 1:
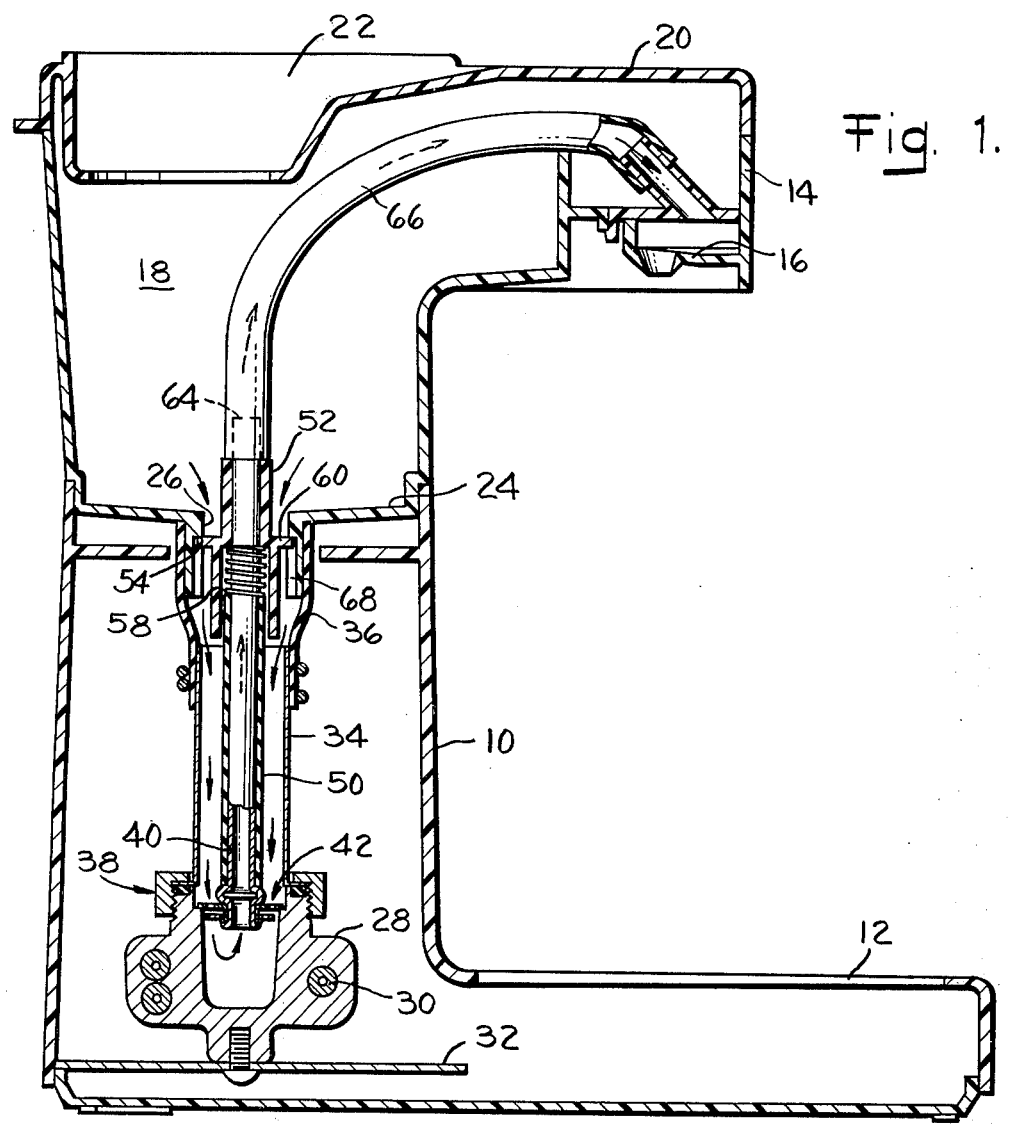
FIG. 1 is a side elevational view in cross-section showing portions of the C-housing and the assembled pumping system.

Referring to FIG. 1, there is shown a typical plastic coffeemaker of the smaller or four-cup variety which includes a molded plastic housing 10 of a generally C-shape and having one lower horizontal leg 12 forming a heated carafe support and the upper horizontal leg 14 containing a water spreader 16 and extending over the lower leg so that a coffee basket and carafe, not shown, are supported in a conventional fashion. The third portion or vertical leg 10 of the housing encloses water reservoir 18 in the upper portion thereof which reservoir is accessible by a removable lid 20 which, in turn, may have an opening 22 through which cold water may be poured into the reservoir to start the coffeemaking operation. To contain the water, reservoir 18 has a bottom wall 24 slanted to funnel the water through a central aperture 26. Water is heated in a cylindrical chamber 28 disposed in the lower portion of the vertical leg, and the chamber is electrically heated by a heater such as the sheath type heater 30 that may be cast directly in the chamber or wound about it and the chamber is secured to a suitable bottom bracket 32 for stability. The heater 30 is electrically energized in a conventional manner not shown. Generally a second heater is disposed in lower leg 12 to keep the carafe warm after the coffee has been brewed. Water is directed from reservoir 18 through aperture 26 and directly into chamber 28 by means of a tubular outer conduit 34 that connects to the apertured wall 24 by a fitting 36 in a sliding fit on both the wall and clamped on the conduit 34 as shown in FIG. 1. The lower end of the outer conduit connects with heated chamber 28 and is held thereon by a suitable threaded collar 38 to provide a connection between the reservoir 18 and the heated chamber 28 for delivery of cold water to the chamber for heating. The water in the chamber 28 boils and is delivered to a point of use by a concentric spaced inner conduit 40 that has an integral one-way valve means 42 that acts as a one-way check valve with a conventional fixed aperture disc 44 sized to seat on a shoulder in heated chamber 28 to allow the incoming water to flow into heated chamber 28. A second slidable valve disc 46 is held on the bottom of conduit 40 and is of a diameter sufficient to block the apertures in disc 44 when in abutment with the disc. The valve is completed by a washer at 48 that is held fixed by flaring over the end of conduit 40 as shown in FIG. 1. Thus, in conventional fashion cold water is permitted to enter from reservoir 18, flow into chamber 28 whereupon it boils and the steam pressure lifts disc 46 to close off apertures 44 and force the water up conduit 40 and to spreader 16 all in a known fashion and the pumping and tube assembly is generally removable by some means for cleaning of the unit all as generally shown in said U.S. Pat. No. 3,996,846.

Figure 2:
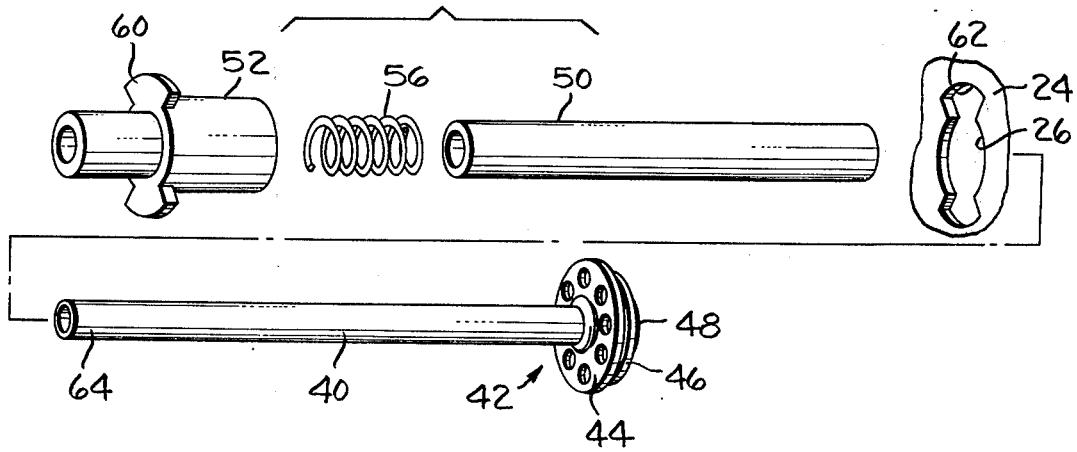
FIG. 2 is a perspective exploded view of the simple four part removable subassembly.

In accordance with the invention, an improvement is provided in the pump and delivery means subassembly to improve on the operation thereof and to reduce the parts required while permitting easy removability requiring no tools so that the entire pump and delivery means may be removed as a subassembly, and then concentric separable parts individually cleaned whereupon the entire subassembly is returned as a unit. To this end, a separate insulating means 50 is provided to surround the inner conduit 40 throughout its entire length from the pump to the upper portion within the insulating fitting 36. In order to lock the pump in position, a separate heat resistant plastic retainer 52 is concentrically supported on the upper end of conduit 40 and is sized to terminate below the upper end of the conduit and abut the insulating means 50 by an internal shoulder or stop means 54. The retainer is telescopically biased by an internal spring 56 between the retainer and the insulating means 50 with the spring resting directly on the upper rim 58 of insulating tube 50 whereby the spring abuts both the retainer and the insulator 50 to telescopically bias the retainer in the manner of a Pogo stick. For making the retainer easily removable it is supplied with horizontal ears 60 of any suitable shape and number, two being sufficient, and a pair of matching slots 62 is provided in aperture 26 and bottom wall 24 as seen in FIG. 2. For maximum insulation of the hot water travelling up inner conduit 40, the retainer is a molded heat resistant plastic and acts as an extension of insulating means 50 thus entirely confining the inner hot water from the outer cold as they travel in opposite directions to avoid loss by heat transfer.

The assembly is completed by extending the inner conduit 40 to provide an end 64 in the reservoir 18 thus extending above the extension of plastic retainer 52. The hot water is delivered to the water spreader 16 by a manually removable flexible elastomer tube 66 easily pushed on a suitable connection both on spreader 16 and on the upper end 64 of spaced inner conduit 40 until it abuts the end of retainer 52 to complete the insulation therewith.

In order to remove the subassembly for easy cleaning, lid 20 is removed and tube 66 is manually pulled off end 64 whereupon the upper portion of retainer 52 is pushed downward against the bias of spring 56 and rotated to unlock the retainer whereupon it is then lifted out and set aside. The top 64 of conduit 40 may be grasped and the entire pump subassembly removed for cleaning. All of the parts are concentrically separable so that each individual part may be easily cleaned. The assembly is done in a reverse fashion with the conduit 40 dropped into position, insulating means 50 placed around the conduit, spring 56 dropped into a butting relation with rim 58 and the retainer ears pushed through slot 62 and the retainer then rotated to lock under wall 24 whereupon tube 66 is pushed on end 64, the lid 20 replaced and the coffeemaker is ready for operation.

While not necessary, rotation of retainer 52 may be limited by providing the bottom wall 24 with spaced stop means 68 to limit the retainer rotation so that, in effect, it is merely necessary to rotate the retainer from unlocked position about 90° whereupon the ears 60 contact the stops wich are out of registry with slots 62 and place the retainer in locked position.

The invention provides a simple four-part, integral pump and conduit 40, insulator tube 50, spring 56, and retainer 52 subassembly which is insulated its entire length by tube 50 and the abutment between top 64 and flexible tube 66 to reduce heat loss from the hot output water inside tube 40 to the cold input water coming down spaced outer tubular conduit 34. Thus, the hot water is completely insulated from the cold to avoid heat transfer and loss of efficiency. Additionally, the insulator 50 also serves as a seat for spring 56 thus performing the dual function of insulating and acting as a stop permitting fewer parts. Consequently, the invention discloses an improved arrangement of fewer parts, that are more efficient from the heat transfer standpoint, and which may be easily removed without tools for cleaning and quick reassembly.

While I have hereinbefore described a preferred form of the invention, obvious equivalent variations are possible in light of the above teachings. It is therefore to be understood that, within the scope of the appended claims, the invention may be practiced otherwise than as specifically described, and the claims are intended to cover such equivalent variations.

I claim:

1. A coffeemaker having an upright C-shaped housing, one horizontal leg having a heated carafe support and the other a water spreader, the vertical leg enclosing an accessible water reservoir having an apertured bottom wall, and a pump and heated chamber in the bottom of said housing for delivering heated water to the spreader, means for heating the water in said chamber a tubular outer conduit connecting said apertured wall and chamber, a concentric spaced inner conduit between said chamber and reservoir interior, an integral one-way valve means on the inner conduit between said conduits in said chamber permitting cold water into said chamber through said outer conduit and hot water exit through said inner conduit, an improvement in said pump and delivery means subassembly comprising, insulating means surrounding said inner conduit its entire length,
 a cylindrical retainer supported on the upper end of said inner conduit,
 spring means between said retainer and insulating means and abutting both to telescopically bias said retainer,
 said retainer including horizontal ears thereon,
 matching slots in said bottom wall aperture, and
 a manually removable and flexible elastomer tube connecting the spreader and upper inner conduit,
 whereby the pump and delivery means may be removed as a subassembly by detaching said elastomer tube, depressing and rotating said retainer to align the ears and slots to unlock the retainer and lift out the entire subassembly for cleaning.

2. Apparatus as described in claim 1 wherein said retainer is heat resistant plastic and has internal stop means for said spring.

3. Apparatus as described in claim 2 wherein said retainer is sized to terminate below the inner conduit in assembled compressed position defining an end in the reservoir manually connected with said elastomer tube.

4. Apparatus as described in claim 3 wherein the reservoir bottom wall has spaced stop means to limit retainer rotation between locked and unlocked position.

5. Apparatus as described in claim 4 wherein the subassembly of inner conduit, insulating means, spring, and retainer are all concentrically separable for cleaning when the retainer is unlocked for lifting the subassembly from the housing.

* * * * *